US009715767B2

(12) United States Patent
Liu et al.

(10) Patent No.: US 9,715,767 B2
(45) Date of Patent: Jul. 25, 2017

(54) METHOD AND APPARATUS FOR PROCESSING REALTIME VEHICLE OPERATING DATA

(71) Applicant: LAUNCH TECH CO., LTD., Shenzhen, Guangdong (CN)

(72) Inventors: Jun Liu, Guangdong (CN); Shelin Shen, Guangdong (CN)

(73) Assignee: LAUNCH TECH CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/774,465

(22) PCT Filed: Jan. 15, 2015

(86) PCT No.: PCT/CN2015/070726
§ 371 (c)(1),
(2) Date: Sep. 10, 2015

(87) PCT Pub. No.: WO2016/019705
PCT Pub. Date: Feb. 11, 2016

(65) Prior Publication Data
US 2016/0203653 A1    Jul. 14, 2016

(30) Foreign Application Priority Data

Aug. 7, 2014   (CN) .......................... 2014 1 0387984

(51) Int. Cl.
*G05B 19/042* (2006.01)
*G07C 5/00* (2006.01)
(Continued)

(52) U.S. Cl.
CPC .......... *G07C 5/008* (2013.01); *G05B 19/042* (2013.01); *G06F 1/3234* (2013.01); *G07C 5/02* (2013.01); *G07C 5/085* (2013.01)

(58) Field of Classification Search
None
See application file for complete search history.

(56) References Cited

U.S. PATENT DOCUMENTS 5,652,911 A * 7/1997 Van Venrooy ............ G06F 9/46
700/245
5,860,020 A * 1/1999 Van Venrooy ............ G06F 9/46
709/201
(Continued)

FOREIGN PATENT DOCUMENTS

CN          101000711         7/2007
CN          101181894         5/2008
(Continued)

*Primary Examiner* — Russell Frejd
(74) *Attorney, Agent, or Firm* — Hamre, Schumann, Mueller & Larson, P.C.

(57) ABSTRACT

The objective of the present application is to provide a method and apparatus for processing real-time vehicle operating data, aiming at solving the technical problem that car owners couldn't obtain real-time vehicle operating data to ensure safety via an existing vehicle-mounted system. The method comprises: obtaining real-time vehicle operating data from an electronic control unit of the vehicle via a vehicle bus; reading the real-time vehicle operating data from a serial port; determining whether there is data that needs to be answered in the real-time vehicle operating data and storing the real-time vehicle operating data into a data queue whose data need to be answered and a data queue whose data doesn't need to be answered respectively after the determination; transmitting the real-time vehicle operating data to a background server, so that the background server can provide current vehicle with diagnostic message or service information. Compared with the prior art, the method provided in the embodiment of the present applica-
(Continued)

tion can provide car owners with remote diagnosis or remote service conveniently, thereby reducing various costs of using cars.

14 Claims, 8 Drawing Sheets (51) Int. Cl.
*G07C 5/02* (2006.01)
*G07C 5/08* (2006.01)
*G06F 1/32* (2006.01)

(56) References Cited

U.S. PATENT DOCUMENTS

| | | | | |
|---|---|---|---|---|
| 6,233,602 | B1* | 5/2001 | Van Venrooy | G01C 21/26 709/203 |
| 7,880,609 | B2* | 2/2011 | Viegers | G06Q 10/06 340/521 |
| 2004/0039504 | A1* | 2/2004 | Coffee | B28C 5/422 701/482 |
| 2005/0038581 | A1* | 2/2005 | Kapolka | G07C 5/008 701/31.4 |
| 2005/0065678 | A1* | 3/2005 | Smith | G07C 5/008 701/31.4 |
| 2005/0171660 | A1 | 8/2005 | Woolford et al. | |
| 2009/0088924 | A1* | 4/2009 | Coffee | B28C 5/422 701/31.4 |
| 2009/0261971 | A1* | 10/2009 | Viegers | G06Q 10/06 340/539.22 |
| 2009/0299857 | A1* | 12/2009 | Brubaker | G06Q 30/02 705/14.66 |
| 2012/0041638 | A1* | 2/2012 | Johnson | G07C 5/008 701/33.1 |
| 2013/0090850 | A1* | 4/2013 | Mays | G01C 21/36 701/533 |
| 2014/0098060 | A1* | 4/2014 | McQuade | G06F 3/045 345/174 |
| 2014/0195102 | A1* | 7/2014 | Nathanson | G07C 5/0808 701/31.4 |

FOREIGN PATENT DOCUMENTS

| | | |
|---|---|---|
| CN | 202974664 | 6/2013 |
| CN | 10418139 | 12/2014 |

\* cited by examiner

METHOD AND APPARATUS FOR PROCESSING REALTIME VEHICLE OPERATING DATA

TECHNICAL FIELD

The present application relates to the technical field of internet of vehicles, and more particularly, relates to a method and apparatus for processing real-time vehicle operating data.

BACKGROUND

With the improvement of automobile manufacturing technology and the reduction of automobile manufacturing cost, automobiles become commonly used transportation tool gradually; with the development of communication technology, especially the technology of internet of vehicles, automobiles have become mobile living environments more than transportation tools. In order to provide users with perfect automobile living experience, and make the users enjoy more convenient life and get more comfortable experience, background servers should be able to obtain real-time vehicle operation data so as to provide the users with services.

However, speak of most vehicle-mounted systems, a user has to go to a car repair shop and ask a maintenance man in the car repair shop for help if he/she wants to know whether his/her vehicle operates normally. In a travel, there is no way for the user to solve a breakdown occurring in the vehicle, and there is no way for the user to know the travel information during the travel time either, moreover, the conditions for ensuring safety of vehicles are very limited. This is because the data provided by existing OBD (On-Board Diagnostic) interfaces is for professional use only, a common user couldn't obtain the data and couldn't understand the data either, and an existing vehicle-mounted system can't provide the user with perfect experience.

BRIEF SUMMARY

The objective of the present application is to provide a method and apparatus for processing real-time vehicle operating data, aiming at solving the technical problem that car owners couldn't obtain real-time vehicle operating data to ensure safety during automobile moving stage via an existing vehicle-mounted system.

The present invention is implemented by providing a method for processing vehicle operating data, the method comprises:

via a vehicle bus, obtaining real-time vehicle operating data from an electronic control unit of a vehicle;

reading the real-time vehicle operating data from a serial port;

determining whether there is data that needs to be answered in the real-time vehicle operating data, and storing the real-time vehicle operating data into a data queue whose data needs to be answered and a data queue whose data doesn't need to be answered respectively after the determination;

transmitting the real-time vehicle operating data to a background server, so that the background server provides the current vehicle with diagnostic message or service information.

The present invention also aim at providing an apparatus for processing real-time vehicle operating data, the apparatus comprises a first processor and a second processor, the second processor comprises a data reading module, a first judging module and a first transmitting module;

the first processor is configured for obtaining real-time vehicle operating data from electronic control unit of the vehicle via a vehicle bus;

the data reading module is configured for reading real-time vehicle operating data obtained by the first processor from an serial port;

the first judging module is configured for determining whether there is a data that needs to he answered in the real-time vehicle operating data, and storing the real-time vehicle operating data into a data queue whose data need to be answered and a data queue whose data does not need to be answered respectively after determination;

the first transmitting module is configured for transmitting the real-time vehicle operating data to a background server, so that the background server can provide the current vehicle with diagnostic message or service information.

It can be known from the real-time vehicle operating data provided by the embodiment of the present invention that: since the real-time vehicle operating data obtained from the electronic control unit of the vehicle via the vehicle bus can be transmitted to the background server after it is read from the serial port, the background server is able to provide the current vehicle with diagnostic message or service information, thus, compared with the prior art, the method provided by the embodiments of the present invention can provide car owners with remote diagnostic services or remote services conveniently, thereby reducing various costs of using cars.

BRIEF DESCRIPTION OF THE DRAWINGS

FIG. 7-*a* illustrates a schematic block diagram of an apparatus for processing real-time vehicle operating data according to a seventh embodiment of the present invention;

FIG.7-*b* illustrates a schematic block diagram of an apparatus for processing real-time vehicle operating data according to an eighth embodiment of the present invention.

DETAILED DESCRIPTION OF THE PREFERRED EMBODIMENT

In order to make the purpose, the technical solution, and the technical effect of the present application be more clear, the present application will now be described in detail with reference to the accompanying drawings and embodiments.

It should be understood that the specific embodiments are only intended to explain the present invention but not to limit the present invention.

The present application provides a method for processing real-time vehicle operating data, the method comprises: obtaining real-time vehicle operating data from an ECU (Electronic Control Unit) of vehicle via a vehicle bus; reading the real-time vehicle operating data from a serial port; determining whether there is data that needs to be answered in the real-time vehicle operating data and storing the real-time vehicle operating data in a data queue whose data need to be answered and a data queue whose data does not need to be answered respectively after determination; transmitting the real-time vehicle operating data to a background server, so that the background server can provide the current vehicle with diagnostic message or service message. The present invention further provides a corresponding apparatus for processing real-time vehicle operating data. The method and the apparatus for processing real-time vehicle operating data are respectively introduced in detail as follows.

Figure 1:
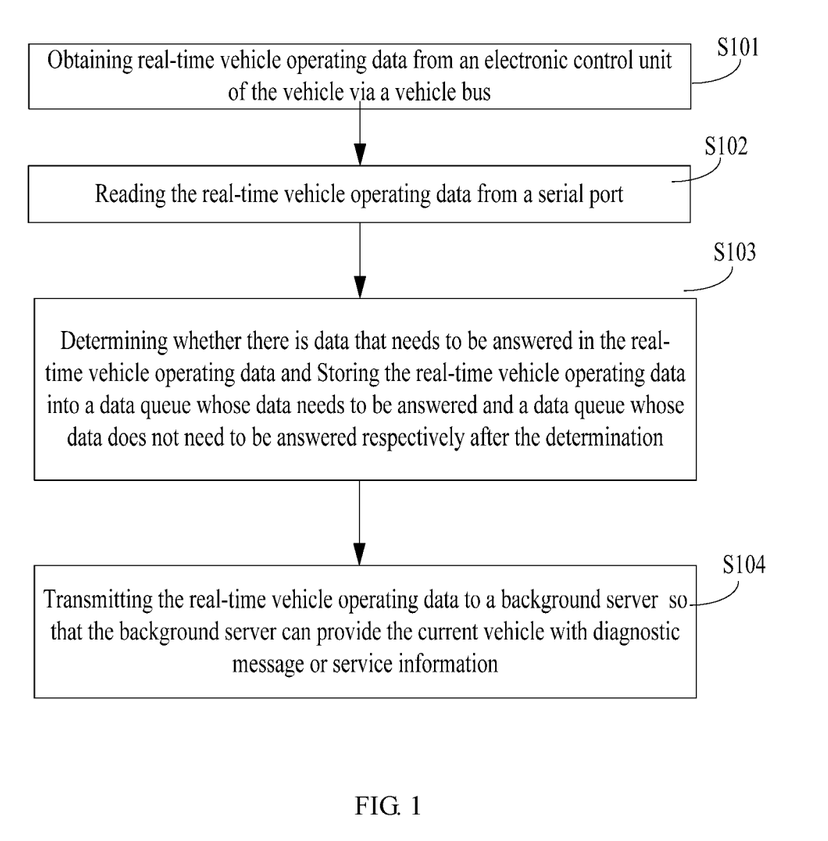
FIG. 1 illustrates a schematic implementing flow chart of a method for processing real-time vehicle operating data according to a first embodiment of the present invention.

Please refer to FIG. 1, which illustrates an implementation flow of the method for processing real-time vehicle operating data in accordance with the first embodiment of the present invention, wherein the method for processing real-time vehicle operating data comprises:

Step 101, obtaining the real-time vehicle operating data from an ECU (Electronic Control Unit) of the vehicle via a vehicle bus.

In the embodiment of the present invention, a processor, which is configured inside a golo3 connector developed by Shenzhen city Yuan Zheng technology company limited by shares, for example, a processor formed by DPU (Distributed Processing Unit) chip, can communicate with an ECU of the vehicle via the vehicle bus and obtain the real-time vehicle operating data from the ECU of the vehicle, wherein the real-time vehicle operating data comprises a real-time dataflow and an identification of the dataflow, a dataflow list, warning information, a fault code, a travel schedule, and so on. It should be noted that the golo3 connector also includes another processor in addition to the processor formed by the DPU chip, the another processor is formed by at least one MTK chip and operates on Android operating system, the application procedure of the another processor is named as "primary service APK (application package)". In order to distinguish the above-mentioned processors and describe them conveniently in the following, herein, the processor formed by the DPU chip is referred to as the first processor, and the processor formed by the MTK chip is referred to as the second processor.

There is also a need to note that before the DPU chip obtains the real-time vehicle operating data via the vehicle bus from the ECU of the vehicle, some devices are initialized by booting the primary service APK directly or booting the primary service APK after it is installed. This initialization includes booting a wireless fidelity, a Bluetooth device, a GPS (Global Position System) serial port, a gravity sensor, and so on.

Step 102, reading the real-time vehicle operating data from a serial port.

In the embodiment of the present invention, the first processor communicates with the second processor via a serial port. Thus, the second processor is able to read the real-time vehicle operating data from the serial port after the first processor has obtained the real-time vehicle operating data from the ECU of vehicle via the vehicle bus.

In another embodiment of the present invention, the second processor can further judge whether the vehicle is stopped according to the real-time vehicle operating data after it reads the real-time vehicle operating data obtained by the first processor. If the vehicle is judged as being stopped, the apparatus for processing real-time vehicle operating data is controlled to be turned into a sleep mode. The aforementioned vehicle real-time operating data processing apparatus mainly includes a first processor and a second processor, that is, a processor formed by at least one DPU chip and a processor formed by at least one MTK chip. As the real-time vehicle operating data includes the speed of vehicle and the wheel rotation speed of vehicle, thus, the vehicle is considered as being stopped when the speed of the vehicle and/or the wheel revolving speed of the vehicle is/are zero. The apparatus for processing real-time vehicle operating data is turned into the sleep mode under control of the processor formed by the MIK chip, for example, making the processor formed by MTK chip be turned into the sleep mode and making the processor formed by DPU lose power, so that the power consumption of the system is saved. Of course, the second processor can further judge whether a wireless fidelity device and a Bluetooth device are connected and whether a new single-chip computer program is performed after it judges that the vehicle has stopped. If the wireless fidelity device and the Bluetooth device are not connected and there is no new single-chip computer program in operating, the real-time vehicle operating data processing apparatus is turned into the sleep mode under the control of the processor formed by the MTK chip. When a broadcasted wakeup signal is received, the apparatus for processing real-time vehicle operating data is initialized again by the primary service APK of the processor formed by the MTK chip.

Step 103, determining whether there is data that needs to be answered in the real-time vehicle operating data, and storing the real-time vehicle operating data into a data queue whose data needs to be answered and a data queue whose data needn't to be answered respectively after the determination.

Both the data queue whose data needs to he answered and the data queue whose data needn't to be answered are data buffering queues, the difference between them is embodied in that it is necessary for a background server to respond after the data buffered in the data queue whose data needs to be answered is sent to the background server, while it is unnecessary for the background server to respond after the data buffered in the data queue whose data does not need to be answered is sent to the background server.

Step 104, the real-time vehicle operating data is sent to the background server, so that the background server provides diagnostic message or service information for the current vehicle.

It can be known from the method for processing vehicle operating data provided by the embodiment of the present invention that since the real-time vehicle operating data obtained from the electronic control unit of vehicle via vehicle bus can be transmitted to the background server after it is read from the serial port, the background server is able to provide the current vehicle with diagnostic message or service information, thus, compared with the prior art, the method provided by the embodiments of the present invention can provide car owners with remote diagnostic services or remote services conveniently, thereby reducing various costs of using cars.

Figure 2:
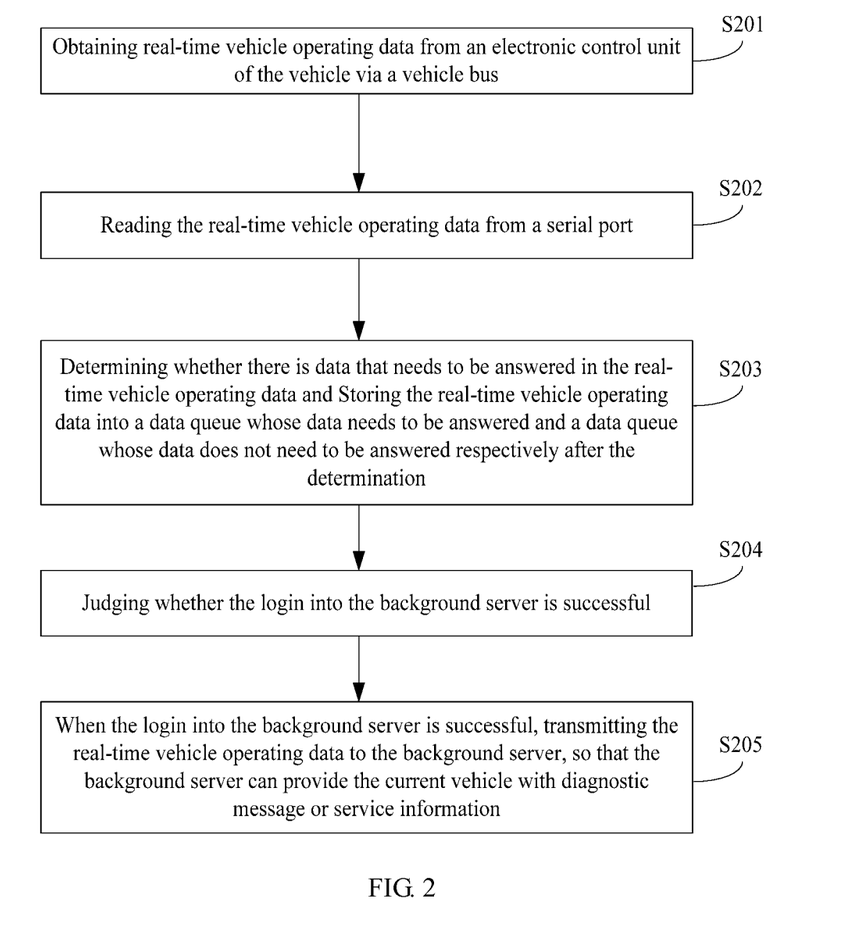
FIG. 2 illustrates a schematic implementing flow chart of a method for processing real-time vehicle operating data according to a second embodiment of the present invention.

Please refer to FIG. 2, an implementation flow of the method for processing real-time vehicle operating data provided by a second embodiment of the present invention is illustrated, the method for processing real-time vehicle operating data includes the following steps 201-205.

Step 201, obtaining the real-time vehicle operating data from the electronic control unit of the vehicle via a vehicle bus.

In the embodiment of the present invention, the processor, which is configured inside a golo3 connector developed by Shenzhen city Yuan Zheng technology company limited by shares, for example, a processor formed by at least one DPU (Distributed Processing Unit) chip, can communicate with the ECU of the vehicle via vehicle bus and obtain the real-time vehicle operating data from the ECU of the vehicle, the real-time vehicle operating data comprises a real-time dataflow, an identification, a dataflow list, warning information, a fault code, a travel schedule, and so on. It should be noted that the golo3 connector also includes another processor in addition to the processor formed by the DPU chip, the another processor is formed by at least one MTK chip and operates on Android operating system, the application procedure of the another processor is named as "primary service APK (Application Package)". In order to distinguish aforementioned processors and describe them conveniently in the following, herein, the processor formed by the DPU chip is referred to as the first processor, and the processor formed by at least one MTK chip is referred to as the second processor.

There is also a need to note that before the DPU chip obtains the real-time vehicle operating data via the vehicle bus from the ECU of the vehicle, some devices are initialized by booting the primary service APK or booting the primary service APK after it is installed. This initialization includes booting of a wireless fidelity, a Bluetooth device, a GPS (Global Position System) serial port, a gravity sensor, and so on.

Step 202, the real-time vehicle operating data is read from a serial port.

In the embodiment of the present invention, the first processor communicates with the second processor via a serial port. Thus, the second processor is able to read the real-time vehicle operating data obtained by the first processor via the vehicle bus.

There is also a need to note that the second processor can not only read the real-time vehicle operating data obtained by the first processor via the serial port, but also read other data such as emergency speed change data, accelerated speed data of vehicle, and vibration alerting data collected by a gravity sensor, and position data obtained by a GPS module.

Step 203, determining whether there is data that needs to he answered in the real-time vehicle operating data and storing the data in a data queue whose data needs to be answered and a data queue whose data needn't to be answered after the determination.

Both the data queue whose data needs to be answered and the data queue whose data needn't to be answered are data buffering queues, the difference between them is embodied in that it is necessary for the background server to respond after the data buffered in the data queue whose data needs to be answered is sent to the background server, while it is unnecessary for the background server to respond after the data buffered in the data queue whose data does not need to be answered is sent to the background server. It should be explained that the data queue whose data needs to be answered and the data queue whose data needn't to be answered can store not only the real-time vehicle operating data but also data obtained by other modules. For example, data such as the emergency speed change data, the vehicle accelerated speed data, and the vibration alerting data collected by the aforementioned gravity sensor can be stored in the data queue whose data needs to be answered, and the position data obtained by the aforementioned GPS module can be stored in the data queue whose data needn't be answered.

Step 204, judging whether a request for login into the background server is successful.

After initialization, the apparatus for processing real-time vehicle operating data or a processor client formed by at least one MTK chip try to login the background server. For example, after judging that there exists 3G (The Third Generation Wireless Communication Technology) signals, the background server is visited via a socket. When a user name and a code for login the background is correct, the login into the background server is successful. If the login into the background server is failed, the real-time vehicle operating data is stored locally.

Step 205, if the login into the background server is successful, the real-time vehicle operating data is sent to the background server, so that the background server can provide diagnostic message or service message for the current vehicle.

Specifically, with regard to the real-time vehicle operating data in the data queue whose data doesn't need to be answered, the real-time vehicle operating data in the data queue whose data needn't be answered can be sent to the background server directly. However, with regard to the real-time vehicle operating data in the data queue whose data need to be answered, sending the real-time vehicle operating data in the data queue whose data need to be answered to the background server, and waiting for a reply from the background server.

It should be noted that both the real-time vehicle operating data buffered in the data queue whose data needs to be answered and the real-time vehicle operating data buffered in the data queue whose data doesn't need to be answered are stored in a database. In the embodiment of the present invention, the real-time vehicle operating data can also be stored in the form of data files. After sending the real-time vehicle operating data in the data queue whose data needs to be answered to the background server and waiting for the reply from the background server, if the background server responses, inquiring whether there exists real-time vehicle operating data stored in the form of data file. If the real-time vehicle operating data stored in the form of data files exists, go on sending the real-time vehicle operating data stored in the form of data files to the background server. Furthermore, if the background server replies an answer after the real-time vehicle operating data in the form of data files is transmitted to the background server, eliminating the real-time vehicle operating data stored locally in the form of data files.

After transmitting the real-time vehicle operating data in the data queue whose data needs to be answered to the background server and waiting for the reply from the background server, if the background server doesn't response, and the continuous sending times exceeds a predetermined sending times, for example, three times, storing the real-time vehicle operating data locally.

Figure 3:
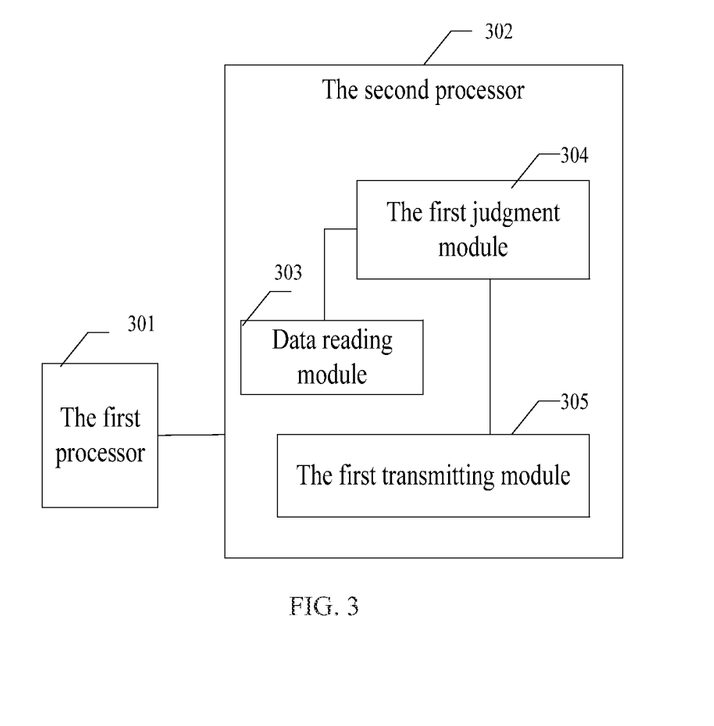
FIG. 3 illustrates a schematic block diagram of an apparatus for processing real-time vehicle operating data processing according to a third embodiment of the present invention.

Please refer to FIG. 3, a structural schematic diagram of the apparatus for processing real-time vehicle operating data provided by the third embodiment of present invention is illustrated. For convenient explanation, only the part regarding the embodiment of the present invention is illustrated. The apparatus for processing real-time vehicle operating data shown in FIG. 3 can be a golo3 connector developed by Shenzhen Yuan Zheng technology company limited by shares, the golo3 connector mainly includes a first processor 301 and a second processor 302, the first processor 301 is formed by at least one DPU chip, the second processor 302 is formed by at least one MTK chip, the second processor 302 includes a data reading module 303, a first judging module 304 and a first transmitting module 305, and the specific explanation is as follows:

the first processor 301 is configured for obtaining real-time vehicle operating data from electronic control unit of vehicle via a vehicle bus;

the data reading module 303 is configured for reading real-time vehicle operating data obtained by the first processor from a serial port;

the first judging module 304 is configured for determining whether there is data that needs to be answered in the real-time vehicle operating data and storing the real-time vehicle operating data in a data queue whose data need to be answered and a data queue whose data does not need to be answered respectively after the determination;

the first transmitting module 305 is configured for transmitting the real-time vehicle operating data to a background server, so that the background server can provide current vehicle with diagnostic message or service information.

It can be known from the apparatus for processing real-time vehicle operating data shown in FIG. 3 that since the real-time vehicle operating data obtained from an ECU of the vehicle via the vehicle bus can be transmitted to the background server after it is read from an serial port, the background server is able to provide the current vehicle with diagnostic message or service information, thus, compared with the prior art, the apparatus for processing vehicle operating data provided by the third embodiment of the present invention is able to provide car owners with remote diagnostic service or remote service conveniently, thereby reducing various costs of using cars.

Figure 4:
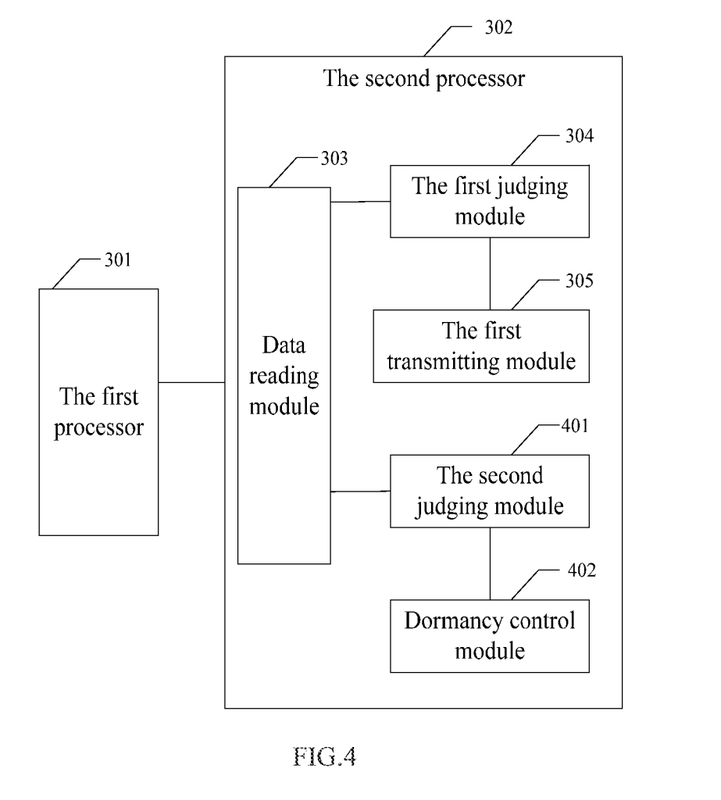
FIG. 4 illustrates a schematic block diagram of an apparatus for processing real-time vehicle operating data according to a fourth embodiment of the present invention.

The second processor 302 shown in FIG. 3 can further include a second judging module 401 and a dormancy control module 402, for example, an apparatus for processing real-time vehicle operating data provided by a fourth embodiment of present invention is shown in FIG. 4, wherein:

the second judging module 401 is configured for judging whether the vehicle is stopped via real-time vehicle operating data after the real-time vehicle operating data is read by the data reading module 303 from a serial port;

the dormancy control module 402 is configured for controlling the apparatus for processing vehicle operating data to turn into a sleep mode when the second judging module 401 judges that the vehicle is stopped.

Figure 5:
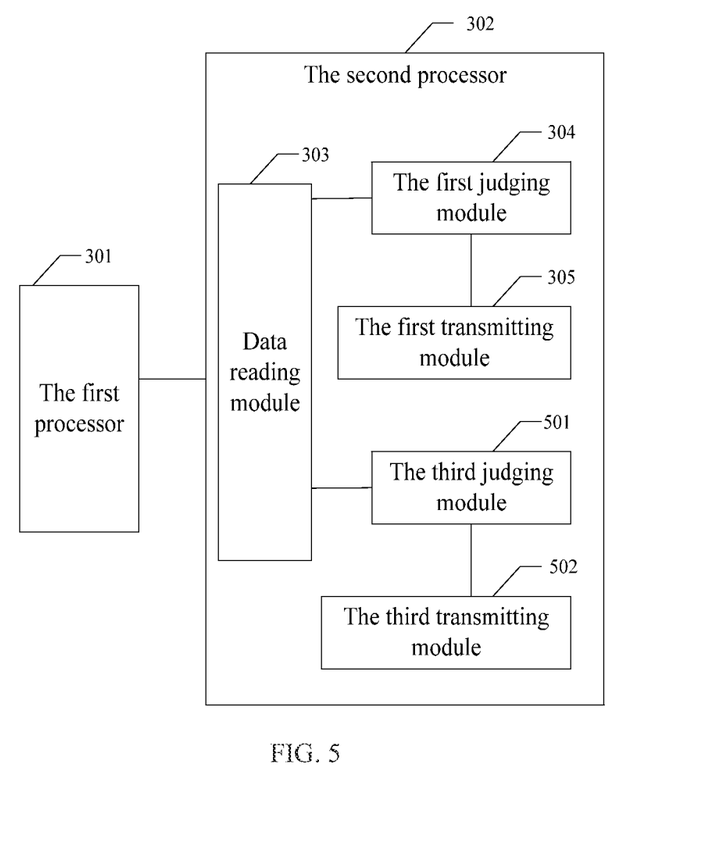
FIG. 5 illustrates a schematic block diagram of an apparatus for processing real-time vehicle operating data according to a fifth embodiment of the present invention.

The second processor 302 shown in FIG. 3 can further include a third judging module 501 and a third transmitting module 502, for example, an apparatus for processing real-time vehicle operating data provided by a fifth embodiment of the present invention is shown in FIG. 5, wherein:

the third judging module 501 is configured for judging whether the login request for the background server is successful before the first transmitting module 305 sends the real-time vehicle operating data to the background server;

the third transmitting module 502 is configured for transmitting the real-time vehicle operating data to the background server when the third judging module 501 judges the login request for the background server is successful.

Figure 6:
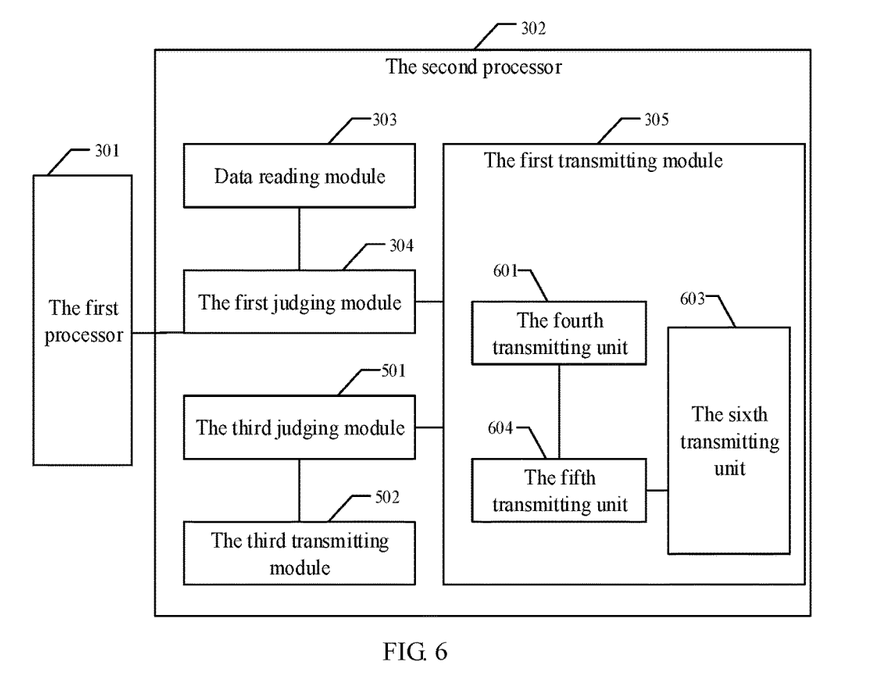
FIG. 6 illustrates a schematic block diagram of an apparatus for processing real-time vehicle operating data according to a sixth embodiment of the present invention.

The first transmitting module 305 shown in FIG. 5 can further include a fourth transmitting unit 601, a fifth transmitting unit 602 and a sixth transmitting unit 603, for example, an apparatus for processing real-time vehicle operating data provided by a sixth embodiment of present invention is shown in FIG. 6, wherein:

the fourth transmitting unit 601 is configured for transmitting the real-time vehicle operating data in the data queue whose data doesn't need to be answered to the background server directly;

the fifth transmitting module 602 is configured for transmitting the real-time vehicle operating data in a data queue whose data need to be answered to a background server and waiting for a response of the background server;

the sixth transmitting module 603 is configured for going on transmitting the real-time vehicle operating data stored in the form of data files to the background server when the background server replies.

Figure 7A:
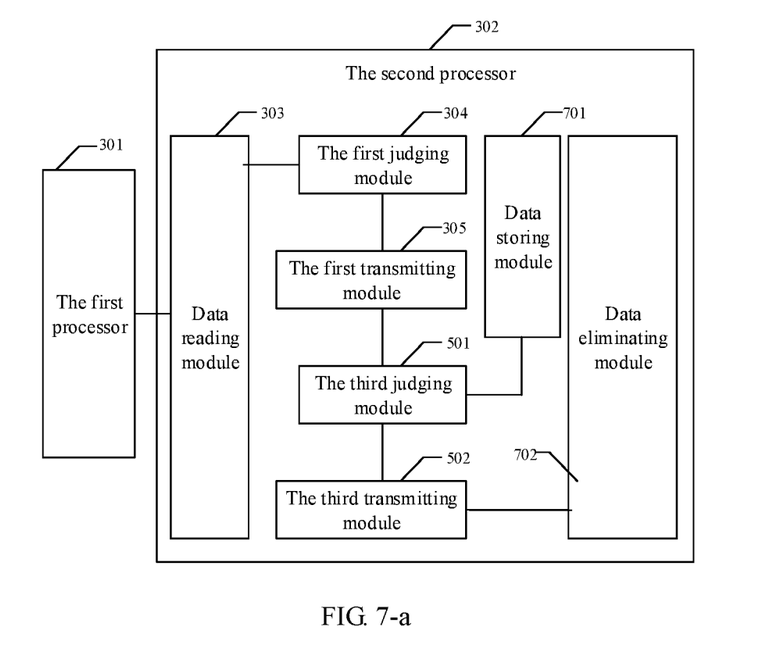
Figure 7B:
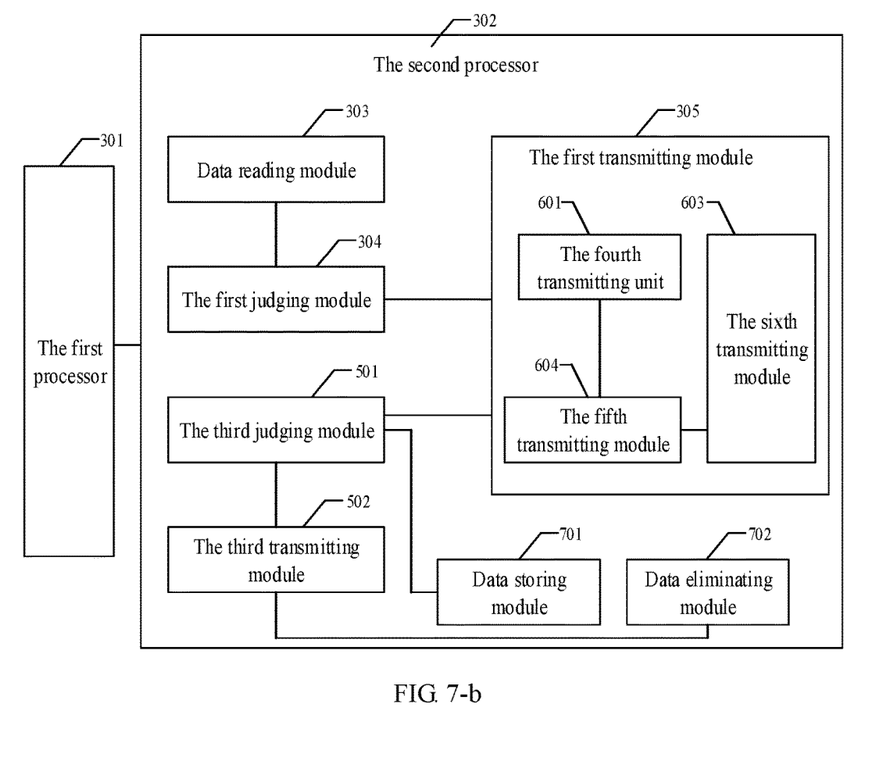

The second processor 302 shown in FIG. 5 or FIG. 6 can also include a data storing module 701 and a data eliminating module 702, for example, an apparatus for processing real-time vehicle operating data provided by a seventh embodiment of the present invention is shown in FIG. 7-a, and an apparatus for processing real-time vehicle operating data provided by an eighth embodiment of the present invention is shown in FIG. 7-b; in the seventh or eighth embodiment:

the data storing module 701 is configured for storing the real-time vehicle operating data locally when the third judging module 501 judges the login into the background server is failed or there is no reply from the background server;

the data eliminating module 702 is configured for eliminating the real-time vehicle operating data stored locally in the form of data files when the background server responses after the real-time vehicle operating data stored in the form of data files is sent to the background server by the third transmitting module 502.

It should be noted that information interaction among the aforementioned modules or units, the executing processes, and some other certain contents are based on the same conception as the method embodiments of present invention, and therefore the apparatus embodiment of the present invention can achieve the same technical effects as the method embodiments of the present invention; the specific content can refer to the description of the method embodiment in the present invention, and is not repeated herein.

Those skilled in the art should understand that a part or all of the procedures of the methods in the above-mentioned embodiments of the present invention can be accomplished by relevant hardware instructed by a program, the program can be stored in a computer readable storage medium, the storage medium can include ROM (Read Only Memory), RAM (Random Access Memory), magnetic disk, optical disk, and so on.

The method and apparatus for processing real-time vehicle operating data are explained in detail above, some specific embodiments are applied to illustrate the principle and the mode of execution of the present invention, the explanation of the aforementioned embodiments are used for facilitating understanding of the method and the core idea of the present invention merely. Meanwhile, for those skilled in the art, the specific embodiments and the application scope can be modified according to the idea of the present invention, in conclusion, the content of the specification should not be understand as limitation of the present invention.

The invention claimed is:

1. A method for processing vehicle operating data, the method comprising:

via a vehicle bus, obtaining real-time vehicle operating data from an electronic control unit of a vehicle;

reading the real-time vehicle operating data from a serial port;

determining whether there is data that needs to be answered in the real-time vehicle operating data and storing the real-time vehicle operating data into a data queue whose data needs to be answered and a data queue whose data does not need to be answered respectively after the determination;

transmitting the real-time vehicle operating data to a background server, so that the background server provides the current vehicle with diagnostic message or service information, wherein transmitting the real-time vehicle operating data to the background server includes:

transmitting the real-time vehicle operating data in the data queue whose data need to be answered to the background server and waiting for a response of the background server;

if the background server replies a response, transmitting the real-time vehicle operating data stored in a form of a data file to the background server;

if the background server replies after the real-time vehicle operating data is transmitted to the background server, eliminating the real-time vehicle operating data stored in the form of data files locally; and if the background server does not reply a response after the real-time vehicle operating data in the form of data file is transmitted to the background server, and a continuous sending time exceeds a predetermined sending time, storing the real-time vehicle operating data locally.

2. The method according to claim 1, wherein after reading the real-time vehicle operating data via the serial port, the method comprises:

judging whether the vehicle is stopped according to the real-time vehicle operating data; and if the judging indicates the vehicle as being stopped, controlling a vehicle operating data processing apparatus to turn into a sleep mode.

3. The method according to claim 2, further comprising:

judging whether a wireless fidelity device and a Bluetooth device are connected and whether a new single-chip computer program is performed after it is judged that the vehicle is stopped; and if the wireless fidelity device and the Bluetooth device are not connected and there is no new single-chip computer program operating, turning the real-time vehicle operating data processing apparatus into the sleep mode.

4. The method according to claim 3, further comprising:

initializing the apparatus for processing real-time vehicle operating data in response to receiving a broadcasted wakeup signal.

5. The method according to claim 1, wherein before the real-time vehicle operating data is transmitted to the background server, the method further comprises:

judging whether a login into the background server is successful; and if the login into the background server is successful, transmitting the real-time vehicle operating data to the background server.

6. The method according to claim 5, wherein transmitting the real-time vehicle operating data to the background server includes:

transmitting the real-time vehicle operating data in the data queue whose data does not need to be answered to the background server directly.

7. The method according to claim 5, wherein if the login into the background server fails, the method comprises storing the real-time vehicle operating data locally.

8. The method according to claim 1, further comprising:

storing data collected by a gravity sensor in the data queue whose data needs to be answered; and storing position data collected by a Global Positioning System (GPS) module in the data queue whose data does not need to be answered, wherein the data collected by the gravity sensor comprises emergency speed change data, vehicle accelerated speed data, and vibration alerting data.

9. The method according to claim 1, before obtaining the real-time vehicle operating data from the electronic control unit of the vehicle via the vehicle bus, the method further comprises:

initializing an apparatus for processing real-time vehicle operating data by booting a primary service application package (APK) directly or booting the primary service APK after it is installed.

10. An apparatus for processing vehicle operating data, comprising:

a first processor and a second processor, the second processor comprises a data reading module, a first judging module, and a first transmitting module, a fifth transmitting module, and a sixth transmitting module;

the first processor is configured for obtaining real-time vehicle operating data from an electronic control unit of the vehicle via a vehicle bus;

the data reading module is configured for reading real-time vehicle operating data obtained by the first processor from an serial port;

the first judging module is configured for determining whether there is data that needs to be answered in the real-time vehicle operating data and storing the classified real-time vehicle operating data into a data queue whose data need to be answered and a data queue whose data does not need to be answered respectively after determination;

the first transmitting module is configured for transmitting the real-time vehicle operating data to a background server, so that the background server can provide the current vehicle with diagnostic message or service information;

the fifth transmitting module configured for transmitting the real-time vehicle operating data in the data queue whose data need to be answered to the background server and waiting for a reply of the background server;

the sixth transmitting module configured for go on transmitting the real-time vehicle operating data stored in the form of data files to the background server if the background server replies a response;

the second processor further comprises a data storing module and a data eliminating module, wherein:

the data storing module is configured for storing the real-time vehicle operating data locally when the login into the background server does not reply a response after the real-time vehicle operating data in the form of a data file is transmitted to the background server, and a continuous sending time exceeds a predetermined sending time; and the data eliminating module is configured for eliminating the real-time vehicle operating data stored locally in the form of data files locally if the background server replies after the real-time vehicle operating data stored in the form of data files is transmitted to the background server.

11. The apparatus according to claim 10, wherein the second processor comprises:
- a second judging module configured for judging whether the vehicle is stopped via the real-time vehicle operating data after the real-time vehicle operating data is read by the data reading module from the serial port; and
- a dormancy control module configured for controlling the apparatus for processing vehicle data processing to turn into a sleep mode when the second judging module judges that the vehicle is stopped.

12. The apparatus according to claim 11, wherein:
the second judging module is further configured for judging whether a wireless fidelity device and a Bluetooth device are connected and whether a new single-chip computer program is performed after it is judged that the vehicle is stopped; and
the dormancy control module is further configured for turning the real-time vehicle operating data processing apparatus into the sleep mode when the second judging module judges that the wireless fidelity device and the Bluetooth device are not connected and there is no new single-chip computer program in operating.

13. The apparatus according to claim 10, wherein the second processor further comprises:
- a third judging module configured for judging whether a login into the background server is successful before the real-time vehicle operating data is transmitted to the background server by the first transmitting module; and
- a third transmitting module configured for transmitting the real-time vehicle operating data to the background server when the login into the background server is successful.

14. The apparatus according to claim 13, wherein the first transmitting module comprises:
- a fourth transmitting unit configured for transmitting the real-time vehicle operating data in the data queue whose data doesn't need to be answered to the background server directly.

* * * * *